(12) United States Patent
Takamuku et al.

(10) Patent No.: US 12,040,834 B2
(45) Date of Patent: Jul. 16, 2024

(54) ADAPTIVE EQUALIZER, ADAPTIVE EQUALIZATION METHOD, AND OPTICAL COMMUNICATION SYSTEM

(71) Applicant: NTT ELECTRONICS CORPORATION, Yokohama (JP)

(72) Inventors: Tomohiro Takamuku, Yokohama (JP); Mitsuteru Yoshida, Yokohama (JP); Tsutomu Takeya, Yokohama (JP); Tomoharu Senboku, Yokohama (JP)

(73) Assignee: NTT INNOVATIVE DEVICES CORPORATION, Kanagawa (JP)

( * ) Notice: Subject to any disclaimer, the term of this patent is extended or adjusted under 35 U.S.C. 154(b) by 331 days.

(21) Appl. No.: 17/596,617

(22) PCT Filed: Jun. 10, 2020

(86) PCT No.: PCT/JP2020/022780
§ 371 (c)(1),
(2) Date: Dec. 14, 2021

(87) PCT Pub. No.: WO2020/255809
PCT Pub. Date: Dec. 24, 2020

(65) Prior Publication Data
US 2022/0303012 A1 Sep. 22, 2022

(30) Foreign Application Priority Data

Jun. 21, 2019 (JP) ................. 2019-115330

(51) Int. Cl.
*H04B 10/2569* (2013.01)
*H04B 3/06* (2006.01)
*H04B 10/61* (2013.01)

(52) U.S. Cl.
CPC ........... *H04B 10/2569* (2013.01); *H04B 3/06* (2013.01); *H04B 10/61* (2013.01)

(58) Field of Classification Search
None
See application file for complete search history.

(56) References Cited

U.S. PATENT DOCUMENTS

2013/0243420 A1 9/2013 Li et al.

FOREIGN PATENT DOCUMENTS

CN 104170286 A 11/2014
CN 109450552 A 3/2019
(Continued)

OTHER PUBLICATIONS

International Preliminary Report on Patentability received for PCT Patent Application No. PCT/JP2020/022780, mailed on Dec. 30, 2021, 9 pages (5 pages of English Translation and 4 pages of Original Document).
(Continued)

*Primary Examiner* — Chad H Smith
(74) *Attorney, Agent, or Firm* — WOMBLE BOND DICKINSON (US) LLP

(57) ABSTRACT

An adaptive equalizer (70) according to this invention includes an adaptive equalization filter (71) configured to adaptively compensate for a waveform distortion caused by a polarization fluctuation of a received signal (61) by updating a tap coefficient, a first tap coefficient updater (72) configured to calculate the tap coefficient according to the polarization fluctuation of the received signal (61) using a variable step size and update the tap coefficient of the adaptive equalization filter (71), a second tap coefficient updater (73) configured to calculate the tap coefficient according to the polarization fluctuation of the received signal (61) using a fixed step size $\mu_0$, a polarization state estimator (74) configured to estimate a polarization state of the received signal (61) using the tap coefficient calculated by the second tap coefficient updater (73), and a step size
(Continued)

updater (75) configured to obtain the step size corresponding to the polarization state estimated by the polarization state estimator (74) and update the variable step size. According to this invention, it is possible to provide an adaptive equalizer that always implements stable followability to various SOP fluctuations.

10 Claims, 5 Drawing Sheets

(56) References Cited

FOREIGN PATENT DOCUMENTS

| JP | 2013-168983 A | 8/2013 |
|----|---------------|--------|
| JP | 2013-223128 A | 10/2013 |
| JP | 2018-174413 A | 11/2018 |
| JP | 2020-043492 A | 3/2020 |
| WO | 2013/139256 A1 | 9/2013 |

OTHER PUBLICATIONS

International Search Report and Written Opinion received for PCT Patent Application No. PCT/JP2020/022780, mailed on Sep. 8, 2020, 11 pages (5 pages of English Translation and 6 pages of Original Document).

Office Action received for Japanese Patent Application No. 2019-115330, mailed on Sep. 8, 2020, 9 pages (5 pages of English Translation and 4 pages of Office Action).

Zhang et al., "Joint Polarization Tracking and Equalization in Real-Time Coherent Optical Receiver", IEEE Photonics Technology Letters, vol. 31, No. 17, Sep. 2019, pp. 1421-1424.

Decision to Grant received for Japanese Patent Application No. 2019-115330, mailed on Apr. 20, 2021, 5 pages (2 pages of English Translation and 3 pages of Original Document).

Office Action received for Chinese Patent Application No. 202080044772.9, mailed on Jul. 29, 2023, 14 pages (8 pages of English Translation and 6 pages of Original Document).

ADAPTIVE EQUALIZER, ADAPTIVE EQUALIZATION METHOD, AND OPTICAL COMMUNICATION SYSTEM

TECHNICAL FIELD

The present invention relates to an adaptive equalizer configured to compensate for the characteristic of a transmission path in data communication, an adaptive equalization method, and a communication apparatus.

BACKGROUND ART

In coherent optical communication, a synchronization error from a processing timing and a distortion of a transmission signal are compensated for by digital signal processing on the receiving side, thereby implementing large-capacity transmission of several ten Gbit/s or more. In the digital signal processing, mainly, processes such as chromatic dispersion compensation, frequency control/phase adjustment, polarization demultiplexing, and polarization dispersion compensation are performed.

In particular, an SOP (State of Polarization) may vary at a high speed. Followability of digital signal processing to the SOP fluctuation is also an important problem. If the SOP fluctuation occurs at a speed on the rad/µs order, the followability of digital signal processing lowers, and a BER (Bit Error Rate) abruptly deteriorates, as is known.

The processes of polarization demultiplexing and polarization dispersion compensation are mainly done by adaptive equalization. An adaptive equalizer in digital signal processing is generally formed by a digital filter. A tap coefficient for canceling the distortion of a transmission signal is set to the digital filter, thereby compensating for the transmission signal. The tap coefficient is sequentially updated while adapting to the temporally changing situation, and compensation following the SOP fluctuation is performed.

To update the tap coefficient of the digital filter that forms the adaptive equalizer, in general, a sequential updating algorithm like a CMA (Constant Modulus Algorithm) is used. It is a step size µ that decides the followability of digital signal processing at the time of adaptive control of the tap coefficient. When the step size µ becomes large, the followability of digital signal processing improves, and the reception durability to a high-speed SOP fluctuation improves. On the other hand, at the time of a low-speed SOP fluctuation, the BER deteriorates due to an influence on noise.

Hence, patent literature 1 proposes adaptively controlling the step size µ in accordance with the SOP fluctuation speed.

RELATED ART LITERATURE

Patent Literature

Patent Literature 1: Japanese Patent Laid-Open No. 2013-223128
Patent Literature 2: Japanese Patent Laid-Open No. 2018-174413
Patent Literature 3: Japanese Patent Laid-Open No. 2013-168983

DISCLOSURE OF INVENTION

Problem to be Solved by the Invention

In the method proposed in patent literature 1, however, once a small step size µ is set by a low-speed SOP fluctuation, followability to a high-speed SOP fluctuation lowers.

The present invention has been made to solve the above-described problem, and has as its object to provide an adaptive equalizer configured to always implement stable followability to various SOP fluctuations, an adaptive equalization method, and an optical communication system.

Means of Solution to the Problem

In order to achieve the above object of the present invention, there is provided an adaptive equalizer (70) comprising an adaptive equalization filter (71) configured to adaptively compensate for a waveform distortion caused by a polarization fluctuation of a received signal (61) by updating a tap coefficient, a first tap coefficient updater (72) configured to calculate the tap coefficient according to the polarization fluctuation of the received signal (61) using a variable step size and update the tap coefficient of the adaptive equalization filter (71) with the calculated tap coefficient, a second tap coefficient updater (73) configured to calculate the tap coefficient according to the polarization fluctuation of the received signal (61) using a fixed step size, a polarization state estimator (74) configured to estimate a polarization state of the received signal (61) using the tap coefficient calculated by the second tap coefficient updater (73), and a step size updater (75) configured to obtain the step size corresponding to the polarization state estimated by the polarization state estimator (74) and update the variable step size with the obtained step size.

According to the present invention, there is also provided an adaptive equalization method comprising a step of executing adaptive equalization filtering of adaptively compensating for a waveform distortion caused by a polarization fluctuation of a received signal (61) by updating a tap coefficient, a first tap coefficient updating step of calculating the tap coefficient according to the polarization fluctuation of the received signal (61) using a variable step size and updating the tap coefficient of the adaptive equalization filtering with the calculated tap coefficient, a second tap coefficient updating step of calculating the tap coefficient according to the polarization fluctuation of the received signal (61) using a fixed step size, a polarization state estimation step of estimating a polarization state of the received signal (61) using the tap coefficient calculated in the second tap coefficient updating step, and a step size updating step of obtaining the step size corresponding to the polarization state estimated in the polarization state estimation step and updating the variable step size with the obtained step size.

According to the present invention, there is also provided an optical communication system comprising a chromatic dispersion compensator (60) configured to compensate for a distortion caused by chromatic dispersion of a received signal, the above-described adaptive equalizer (70) configured to compensate for a polarization fluctuation of an output signal of the chromatic dispersion compensator (60), and a decoder configured to decode an output signal of the adaptive equalizer (70).

The optical communication system may further comprise an optical receiver (40) configured to receive an optical signal and convert the received optical signal into the received signal.

Effect of the Invention

In the present invention, the fixed step size is used independently of the variable step size used to calculate the tap coefficient of the adaptive equalization filter (71). The tap coefficient is calculated using the fixed step size, and the polarization state is estimated using the tap coefficient. Hence, the polarization state can be calculated at a high speed based on the fixed step size even if the polarization state varies, and the variable step size changes. It is therefore possible to always implement stable followability to various polarization state fluctuations.

Also, in the present invention, the tap coefficient is calculated using the variable step size corresponding to the polarization state estimated as described above, and the tap coefficient of the adaptive equalization filter (71) is updated by the tap coefficient. It is therefore possible to prevent the BER from deteriorating even if the fluctuation of the polarization state is small.

BEST MODE FOR CARRYING OUT THE INVENTION

The embodiment of the present invention will now be described in detail with reference to the accompanying drawings.

[Optical Communication System]

Figure 1:
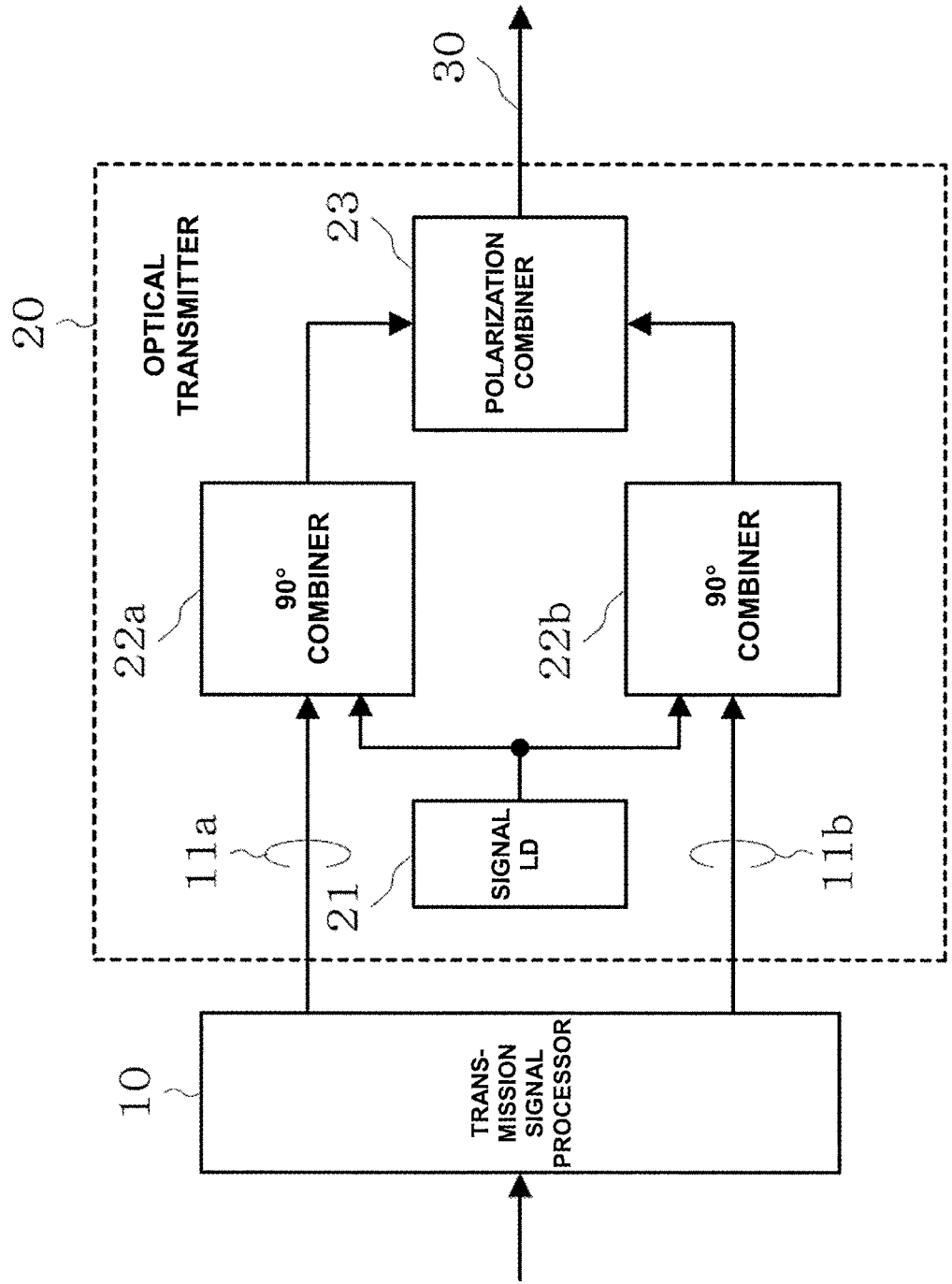
FIG. 1 is a block diagram showing the transmitting-side configuration of an optical communication system according to the embodiment of the present invention.

As shown in FIG. 1, an optical communication system according to the embodiment of the present invention includes a transmission signal processor 10 and an optical transmitter 20 on the transmitting side.

The transmission signal processor 10 is a circuit that performs predetermined processing for input data. More specifically, the transmission signal processor 10 divides input data into horizontal polarization data and vertical polarization data, and performs processes such as error correction coding, band limiting filtering, and modulation mapping for each data. Horizontal polarization data 11a and vertical polarization data 11b, which have undergone such processes, are output to the optical transmitter 20.

The optical transmitter 20 is a circuit that converts each the horizontal polarization data 11a and the vertical polarization data 11b into an optical signal and transmits the converted optical signal. The optical transmitter 20 includes a signal light source (signal LD) 21, two 90° combiners 22a and 22b, and a polarization combiner 23. The 90° combiners 22a and 22b modulate output light from the signal light source 21 by the horizontal polarization data 11a and the vertical polarization data 11b, thereby converting the data 11a and 11b into optical signals. The polarization combiner 23 combine the horizontal polarization data 11a and the vertical polarization data 11b, which are converted into optical signals. The combined signal is transmitted to the receiving side via an optical fiber transmission line 30.

Figure 2:
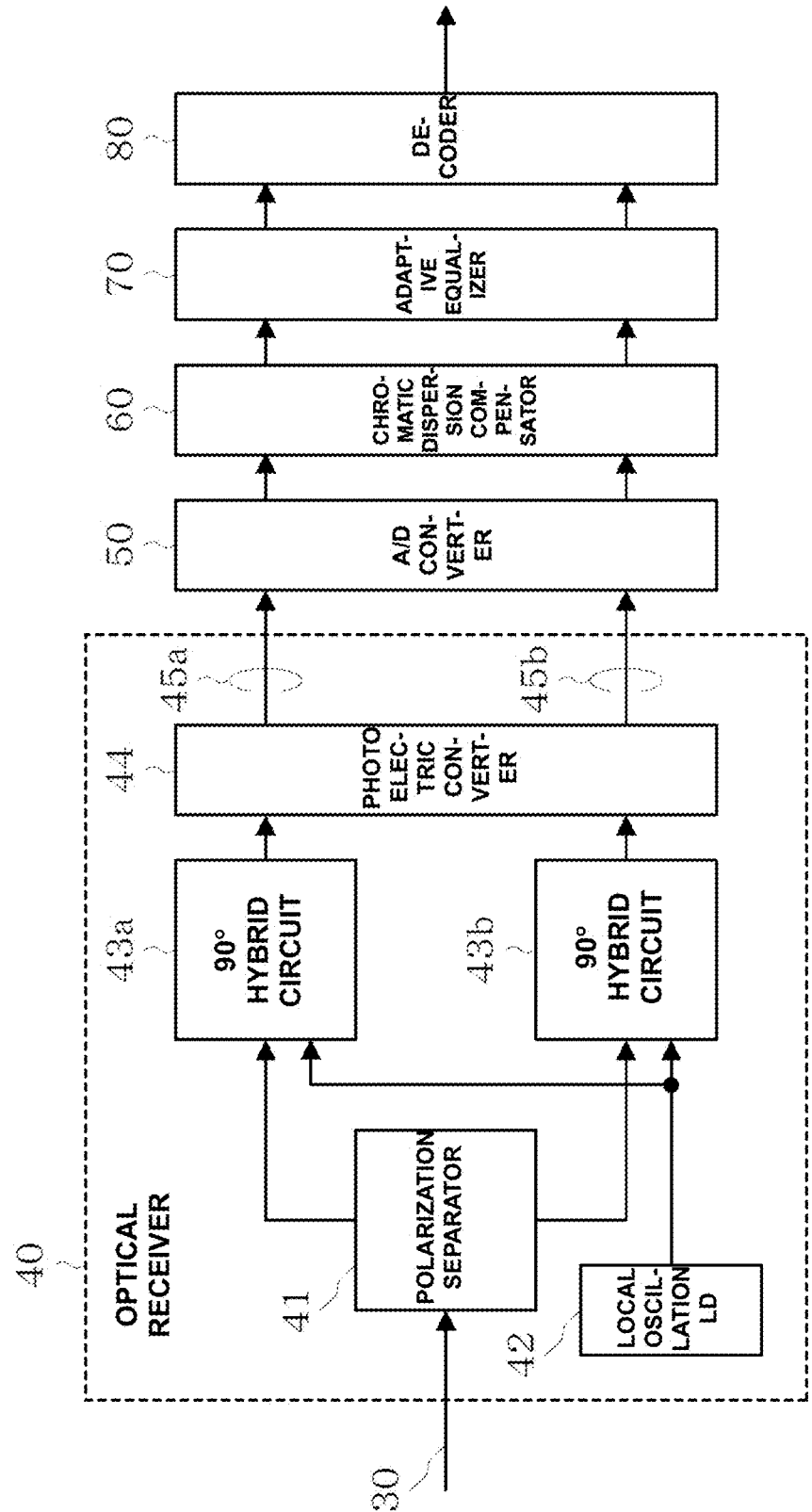
FIG. 2 is a block diagram showing the receiving-side configuration of the optical communication system according to the embodiment of the present invention.

As shown in FIG. 2, the optical communication system according to the embodiment of the present invention includes an optical receiver 40, an A/D converter 50, a chromatic dispersion compensator 60, an adaptive equalizer 70, and a decoder 80 on the receiving side.

The optical receiver 40 is a circuit that receives an optical signal, converts the received optical signal into an electrical signal, and outputs the converted electrical signal. The optical receiver 40 includes a polarization separator 41, a local oscillation light source (local oscillation LD) 42, two 90° hybrid circuits 43a and 43b, and a photoelectric converter 44. The polarization separator 41 separates the optical signal into two orthogonally polarized wave components, that is, an X-polarized wave (horizontally polarized wave) and a Y-polarized wave (vertically polarized wave). The 90° hybrid circuits 43a and 43b combine the polarized waves of the optical signal output from the polarization separator 41 with output light from the local oscillation light source 42 and further separate the polarized waves of the optical signal into an in-phase (I) component and a quadrature (Q) component. The photoelectric converter 44 converts the components of the optical signal output from the 90° hybrid circuits 43a and 43b into electrical signals, and outputs the electrical signals as an X-polarization signal 45a and a Y-polarization signal 45b. The X-polarization signal 45a and the Y-polarization signal 45b will be referred to as received signals hereinafter.

The A/D converter 50 converts the received signals output from the optical receiver 40 into digital signals.

When the optical signal propagates through the optical fiber transmission line 30, the signal waveform is distorted by chromatic dispersion. The chromatic dispersion compensator 60 estimates the magnitude of a distortion from the received signals output from the A/D converter 50, and compensates for distortions of the received signals caused by chromatic dispersion.

Also, when the X-polarization signal and the Y-polarization signal are combined and transmitted on the transmitting side, and the X-polarization signal and the Y-polarization signal are separated on the receiving side, a polarization fluctuation occurs due to polarization mode dispersion, and the signal waveform is distorted. The adaptive equalizer 70 performs equalization processing of compensating for distortions caused, by the polarization fluctuation, in the received signals output from the chromatic dispersion compensator 60. Note that although polarization separation is performed first in the optical receiver 40, the adaptive equalizer 70 processes the polarization separation more completely.

The decoder 80 decodes the received signals output from the adaptive equalizer 70, and reproduces the original data (that is, the input data to the transmission signal processor 10).

[Configuration of Adaptive Equalizer]

Figure 3:
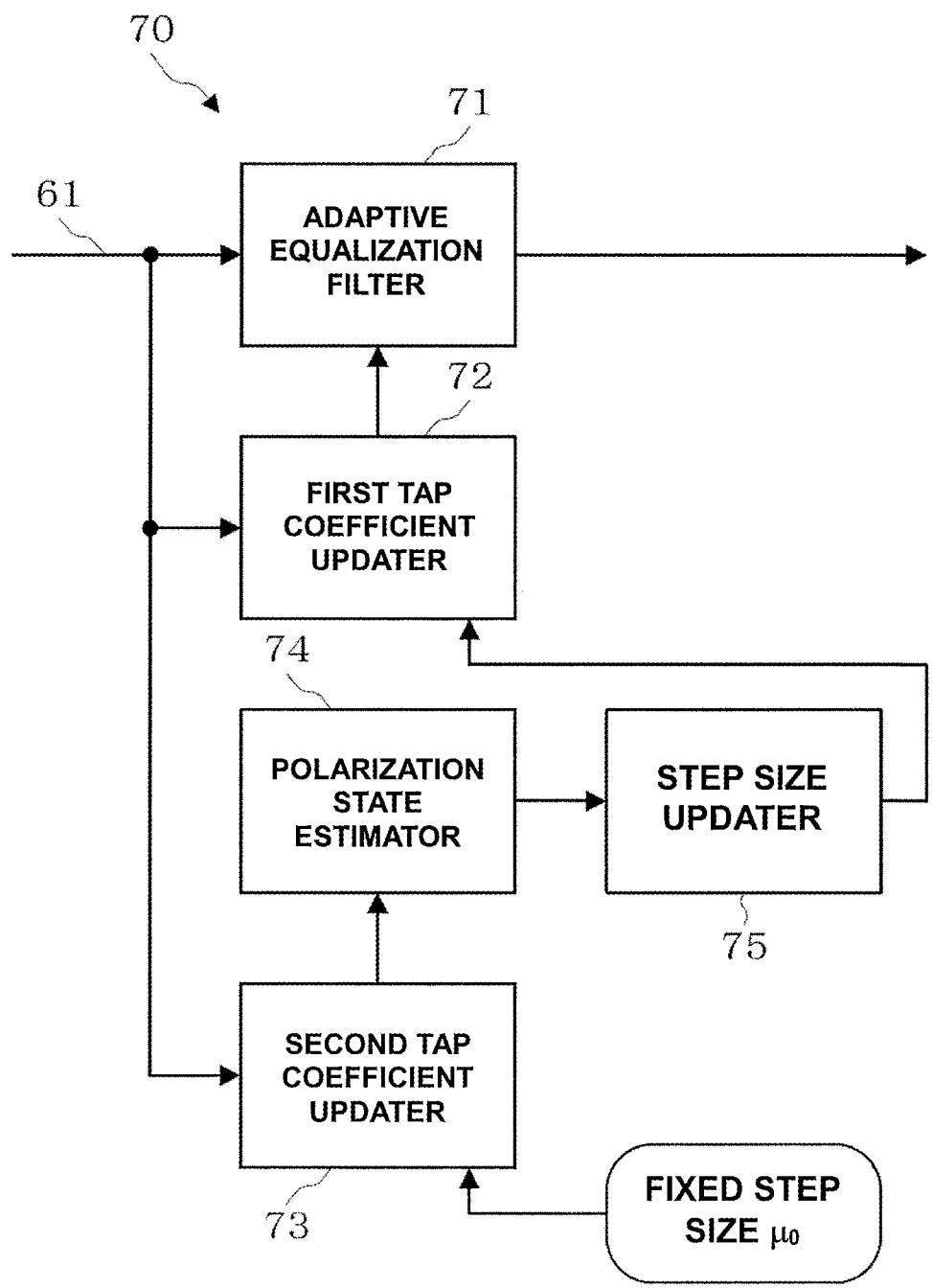
FIG. 3 is a block diagram showing the configuration of an adaptive equalizer according to the embodiment of the present invention.

The configuration of the adaptive equalizer 70 according to the embodiment of the present invention will be described next. As shown in FIG. 3, the adaptive equalizer 70 includes an adaptive equalization filter 71, a first tap coefficient updater 72, a second tap coefficient updater 73, a polarization state estimator 74, and a step size updater 75.

The adaptive equalization filter 71 is a circuit that adaptively compensates for a waveform distortion caused by a polarization fluctuation of a received signal 61 ($X_{in}(n)$, $Y_{in}(n)$) by updating a tap coefficient. The adaptive equalization filter 71 can be formed by a general digital filter and, more particularly, an FIR filter (Finite Impulse Response Filter).

Figure 4:
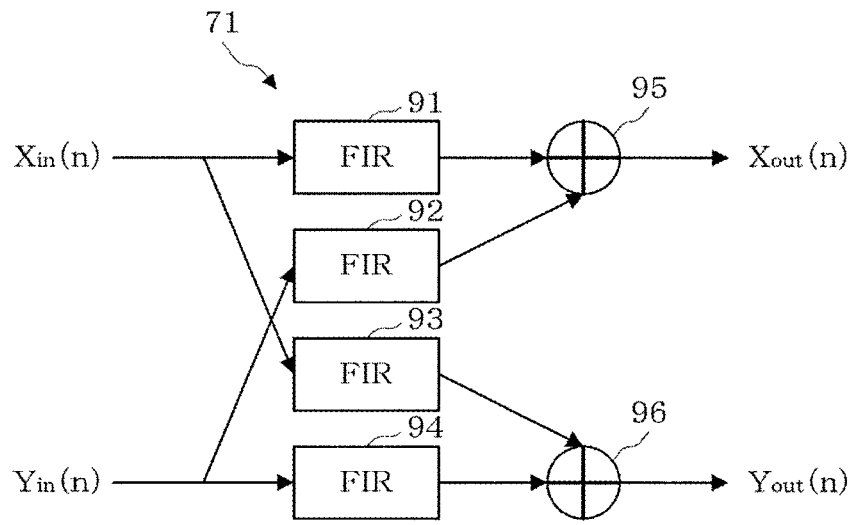
FIG. 4 is a block diagram showing the configuration of an adaptive equalization filter shown in FIG. 3.

The adaptive equalization filter 71 shown in FIG. 4 has a butterfly-type circuit configuration. That is, the input $X_{in}(n)$ is given to an FIR filter 91 and an FIR filter 93. Also, the input $Y_{in}(n)$ is given to an FIR filter 92 and an FIR filter 94. The output of the FIR filter 91 and the output of the FIR filter 92 are added by an addition circuit 95, and the addition result is an output $X_{out}(n)$. Also, the output of the FIR filter 93 and the output of the FIR filter 94 are added by an addition circuit 96, and the addition result is an output $Y_{out}(n)$. The inputs $X_{in}(n)$ and $Y_{in}(n)$ are an X-polarization signal and a Y-polarization signal that have undergone polarization separation by the optical receiver 40 and chromatic dispersion compensation by the chromatic dispersion compensator 60. Letting $h_{xx}(n)$, $h_{xy}(n)$, $h_{yx}(n)$, and $h_{yy}(n)$ be the tap coefficients set to the FIR filters 91, 92, 93, and 94, respectively, the output $X_{out}(n)$ and the output $Y_{out}(n)$ are represented by $$X_{out}(n)=h_{xx}(n)*X_{in}(n)+h_{xy}(n)*Y_{in}(n)$$

$$Y_{out}(n)=h_{yx}(n)*X_{in}(n)+h_{yy}(n)*Y_{in}(n)$$

where "*" represents a convolutional operation, and n represents the sample order of data. Note that each tap coefficient is a group of a plurality of tap coefficients.

Polarization separation and compensation of a waveform distortion are implemented by the adaptive equalization filter 71. If the state of polarization varies, the tap coefficients of the adaptive equalization filter 71 need to be updated in accordance with the polarization fluctuation to improve the compensation accuracy.

The first tap coefficient updater 72 is a circuit that calculates tap coefficients according to the polarization fluctuation of the received signal 61 ($X_{in}(n)$, $Y_{in}(n)$) using a variable step size $\mu$ and updates the tap coefficients of the adaptive equalization filter 71 by the calculated tap coefficients. As an algorithm for calculating the tap coefficients of the adaptive equalization filter 71, for example, the CMA is used, and the tap coefficients are updated by $$h_{xx}(n+1)=h_{xx}(n)+\mu\varepsilon_x(n)X_{out}(n)\cdot X_{in}^*(n)$$

$$h_{xy}(n+1)=h_{xy}(n)+\mu\varepsilon_x(n)X_{out}(n)\cdot Y_{in}^*(n)$$

$$h_{yx}(n+1)=h_{yx}(n)+\mu\varepsilon_y(n)Y_{out}(n)\cdot X_{in}^*(n)$$

$$h_{yy}(n+1)=h_{yy}(n)+\mu\varepsilon_y(n)Y_{out}(n)\cdot Y_{in}^*(n)$$

where $\varepsilon_x(n)$ and $\varepsilon_y(n)$ are error evaluation functions, and $X_{in}^*(n)$ and $Y_{in}^*(n)$ are complex conjugates of the inputs $X_{in}(n)$ and $Y_{in}(n)$ of the FIR filters 91 to 94.

In principle, the first tap coefficient updater 72 can include filters similar to those of the adaptive equalization filter 71. In this case, calculation of the CMA can be performed in the circuit of the first tap coefficient updater 72 without receiving supply of the outputs $X_{out}(n)$ and $Y_{out}(n)$ from the adaptive equalization filter 71. A configuration that does not include filters similar to those of the adaptive equalization filter 71 can also be formed by receiving supply of the outputs $X_{out}(n)$ and $Y_{out}(n)$ from the adaptive equalization filter 71, as a matter of course.

Note that the algorithm for obtaining the tap coefficients of the adaptive equalization filter 71 is not limited to CMA, and various kinds of sequential updating algorithms using the step size $\mu$, for example, blind equalization (RDE (Radius directed equalization) or the like) can also be used. It is also possible to use a sequential updating algorithm which inserts a known signal such as a training signal or a pilot signal into an optical signal on the transmitting side, and updates and obtains tap coefficients for each step size such that the comparison error between the transmitted known signal and the true value of the known signal is minimized, like RLS (Recursive Least-Squares) and LMS (Least Mean Square). The variable step size $\mu$ of the first tap coefficient updater 72 is supplied from the step size updater 75 to be described later.

The second tap coefficient updater 73 is a circuit that calculates tap coefficients according to the polarization fluctuation of the received signal 61 ($X_{in}(n)$, $Y_{in}(n)$) using a fixed step size $\mu_0$. The tap coefficients calculated here are used to estimate a polarization state to be described later, and are not supplied to the adaptive equalization filter 71.

The second tap coefficient updater 73 is configured, like the first tap coefficient updater 72, to calculate the tap coefficients of the adaptive equalization filter 71. To observe a high-speed polarization fluctuation, the relatively large fixed step size $\mu_0$ is used as the step size $\mu$. The fixed step size $\mu_0$ is a step size empirically obtained to obtain an optimum convergence in various polarization fluctuations in the sequential updating algorithm to be used. The step size obtained in patent literature 3 can also be used. The fixed step size $\mu_0$ can be set to, for example, a value larger than the average value of assumed values of the variable step size $\mu$ set from the step size updater 75 to be described later to the first tap coefficient updater 72 or a value larger than the intermediate value between the assumed maximum value and the minimum value of the variable step size $\mu$.

Like the first tap coefficient updater 72, if the CMA is used for the calculation of the second tap coefficient updater 73, the tap coefficients are calculated by $$h_{xx}(n+1)=h_{xx}(n)+\mu_0\varepsilon_x(n)X_{out}(n)\cdot X_{in}^*(n)$$

$$h_{xy}(n+1)=h_{xy}(n)+\mu_0\varepsilon_x(n)X_{out}(n)\cdot Y_{in}^*(n)$$

$$h_{yx}(n+1)=h_{yx}(n)+\mu_0\varepsilon_y(n)Y_{out}(n)\cdot X_{in}^*(n)$$

$$h_{yy}(n+1)=h_{yy}(n)+\mu_0\varepsilon_y(n)Y_{out}(n)\cdot Y_{in}^*(n)$$

The thus calculated tap coefficients are supplied to the polarization state estimator 74. In the calculation of the second tap coefficient updater 73, the fixed step size $\mu_0$ is used. It is therefore possible to stably ensure convergence in the tap coefficient calculation independently of the step size $\mu$ from the step size updater 75 to be described later. Note that in the second tap coefficient updater 73, the algorithm for obtaining the tap coefficients is not limited to CMA, like the first tap coefficient updater 72, and various kinds of sequential updating algorithms using the step size can be used.

The polarization state estimator 74 is a circuit that estimates a polarization state SOP of the input signal to the second tap coefficient updater 73 using the tap coefficients calculated by the second tap coefficient updater 73. The input signal to the second tap coefficient updater 73 is the received signal 61, like the input signals to the adaptive equalization filter 71 and the first tap coefficient updater 72. Hence, the polarization state SOP estimated by the polarization state estimator 74 is the polarization state SOP of the received signal 61 input to the first tap coefficient updater.

A plurality of methods can be used to estimate the polarization state SOP. For example, a method disclosed in patent literature 1 can be used. That is, stokes parameters representing the polarization state SOP are obtained from the tap coefficients of the adaptive equalization filter 71, and a polarization state fluctuation amount and a SOP fluctuation speed are obtained from the stokes parameters. The stokes parameters that express the polarization state SOP of the optical signal can be calculated by $$S_1 = \cos(2\phi)\cos(2\psi)$$

$$S_2 = \sin(2\phi)\cos(2\psi)$$

$$S_3 = \sin(2\phi)$$

Here, concerning X-polarization, $\phi$ and $\psi$ are represented by $$\phi_x = \tan^{-1}(|h_{xy}(f)|/|h_{xx}(f)|),$$

$$\psi_x = \tan^{-1}(\text{Im}\{h_{xy}(f)/h_{xx}(f)\}/\text{Re}\{h_{xy}(f)/h_{xx}(f)\})$$

where $h_{xx}(f)$ and $h_{xy}(f)$ are the central taps of the coefficients of the adaptive equalizer 70 when f=0 in the frequency domain. This can also be applied to Y-polarization.

A polarization state fluctuation amount $\Delta\theta$ after $\Delta t = t_2 - t_1$ sec from time $t_1$ to $t_2$ is obtained by the inner product of stokes vectors $S(t_1) = [S_1(t_1), S_2(t_1), S_3(t_1)]$ and $S(t_2) = [S_1(t_2), S_2(t_2), S_3(t_2)]$. Hence, the SOP fluctuation speed $\omega$ can be calculated by $$\omega = \Delta\theta/\Delta t = \cos^{-1}(S(t_1) \cdot S(t_2)/(|S(t_1)||S(t_2)|))/\Delta t$$

The polarization state estimator 74 outputs the SOP fluctuation speed $\omega$ as the polarization state SOP to the step size updater 75. Note that the polarization state estimator 74 may output the polarization state fluctuation amount $\Delta\theta$ as the polarization state SOP. Since $\Delta t$ is a set value, the polarization state fluctuation amount $\Delta\theta$ and the SOP fluctuation speed $\omega$ are considered to be synonymous with each other in this specification.

As the estimation method of the polarization state SOP, a method disclosed in patent literature 2 can also be used. That is, the SOP fluctuation speed $\omega$ is obtained from the tap coefficients of the adaptive equalization filter 71.

This method uses the fact that the tap coefficients of the FIR filters 91 to 94 of the adaptive equalizer 70, which are updated by adaptive equalization, have a relationship with the stokes parameters, as in patent literature 1. Patent literature 2 also uses the fact that a time-rate change of the tap coefficients indicates the fluctuation of the polarization state. Using tap coefficients $h_{xx,i}$, $h_{xy,i}$, $h_{yx,i}$, and $h_{yy,i}$, a fluctuation of the polarization state is represented by $$\begin{cases} S(n) = S_{xx}(n) + S_{xy}(n) + S_{yx}(n) + S_{yy}(n) \\ S_{xx}(n) = \sum_{i=1}^{M} |\Delta h_{xx,i}(n)| \\ S_{xy}(n) = \sum_{i=1}^{M} |\Delta h_{xy,i}(n)| \\ S_{yx}(n) = \sum_{i=1}^{M} |\Delta h_{yx,i}(n)| \\ S_{yy}(n) = \sum_{i=1}^{M} |\Delta h_{yy,i}(n)| \end{cases}$$

where M is the number of taps of the FIR filters 91 to 94, and i is the order of taps. $\Delta h_{xx,i}(n)$, $\Delta h_{xy,i}$, $\Delta h_{yx,i}$, and $\Delta h_{yy,i}$ are the time-rate change amounts of the tap coefficients, which are represented by $$\Delta h_{xx,i}(n) = h_{xx,i}(n) - h_{xx,i}(n-1)$$

$$\Delta h_{xy,i}(n) = h_{xy,i}(n) - h_{xy,i}(n-1)$$

$$\Delta h_{yx,i}(n) = h_{yx,i}(n) - h_{yx,i}(n-1)$$

$$\Delta h_{yy,i}(n) = h_{yy,i}(n) - h_{yy,i}(n-1)$$

$S_{xx}(n)$ is a value obtained by adding the absolute values of the time-rate change amounts of the elements of a tap coefficient vector $h_{xx}$. Similarly, $S_{xy}(n)$, $S_{yx}(n)$, and $S_{yy}(n)$ are values obtained by adding the absolute values of the time-rate change amounts of the elements of tap coefficient vectors $h_{xy}$, $h_{yx}$, and $h_{yy}$. By the above equations, the fluctuation S(n) is calculated, and the period of the calculated fluctuation S(n) is calculated. When the reciprocal of the period (frequency) of the fluctuation S(n) is calculated, the SOP fluctuation speed $\omega$ of the polarization state can be estimated. Alternatively, Fourier transformation may be performed for the fluctuation S(n) to estimate the SOP fluctuation speed $\omega$ of the polarization state. The estimated SOP fluctuation speed $\omega$ is supplied as the output of the polarization state estimator 74 to the step size updater 75.

Figure 5:
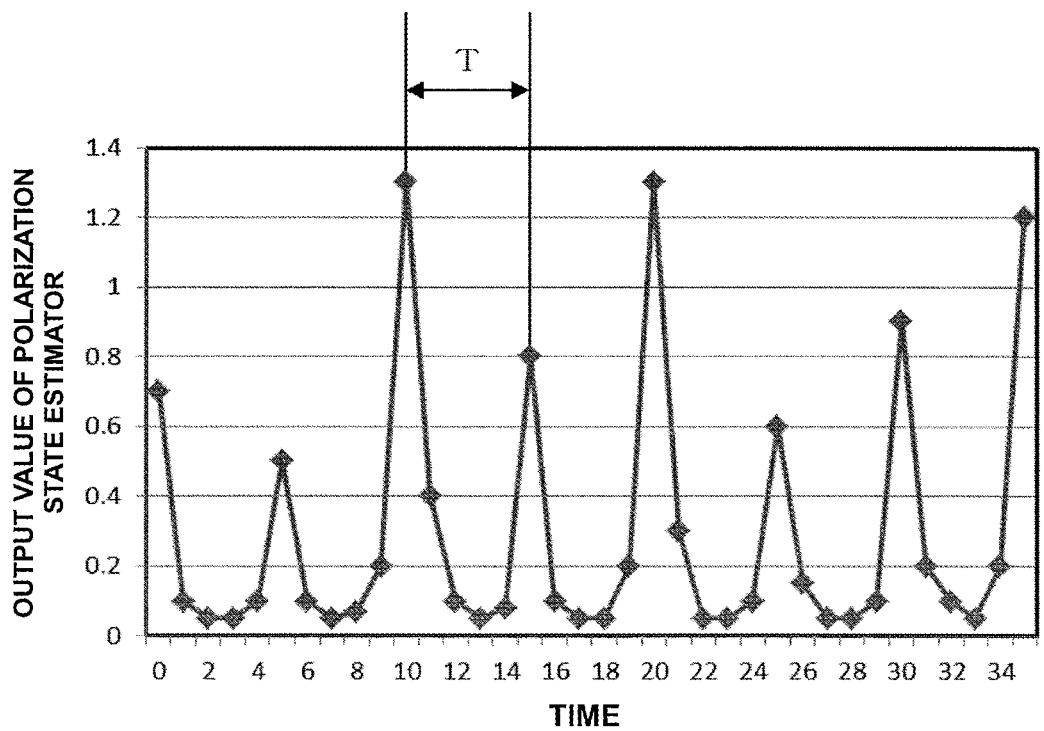
FIG. 5 is a graph showing the image of the output of a polarization state estimator shown in FIG. 4.

FIG. 5 shows the image of the output of the polarization state estimator 74. In this image, the polarization state fluctuation amount $\Delta\theta$ output from the polarization state estimator 74 in a case in which the received signal 61 (called a polarization scrambler) controlled to change the polarization state randomly at a predetermined polarization fluctuation speed is generated and supplied to the adaptive equalizer 70 is plotted with respect to time. As can be seen from this graph, the polarization state fluctuation amount $\Delta\theta$ generates a peak at a period T of the predetermined polarization fluctuation speed. Hence, the SOP fluctuation speed $\omega$ can be estimated by detecting the period T of the peak. Note that it has been experimentally grasped that if the SOP fluctuation speed $\omega$ is high, the number of peaks of the polarization state fluctuation amount $\Delta\theta$ in a predetermined time width tends to be large, as compared to a case in which the SOP fluctuation speed $\omega$ is low.

As the estimation method of the polarization state SOP in the polarization state estimator 74, any method can be used if the tap coefficients of the adaptive equalization filter 71 are used, and the method is not limited to the above-described method.

The step size updater 75 is a circuit that obtains the step size $\mu$ corresponding to the polarization state estimated by the polarization state estimator 74, and updates the variable step size $\mu$ of the first tap coefficient updater 72 by the step size $\mu$. That is, the step size updater 75 adaptively controls the step size $\mu$ of the first tap coefficient updater 72 in accordance with the SOP fluctuation speed $\omega$ output from the polarization state estimator 74.

According to patent literature 1, the optimum step size that minimizes a bit error rate BER when adaptive equalization processing is applied to the received signal 61 in which a SOP fluctuation occurs at the certain SOP fluctuation speed $\omega$ can be approximated by $$\mu = (A\omega)^{1/2} + B$$

where A and B are constants other than 0.

When this relational expression is used, the step size $\mu$ corresponding to the SOP fluctuation speed $\omega$ of the received signal 61 input to the adaptive equalization filter 71 can be decided. Note that patent literature 1 shows that the constants A and B can adaptively be obtained by digital signal processing. According to the above-described relational expression, a relatively small step size $\mu$ can be obtained in correspondence with a low SOP fluctuation speed $\omega$, and a relatively large step size $\mu$ can be obtained in correspondence with a high SOP fluctuation speed $\omega$. Note that an approximate expression can also be used in place of the relational expression. An error to some extent is allowable.

Figure 6:
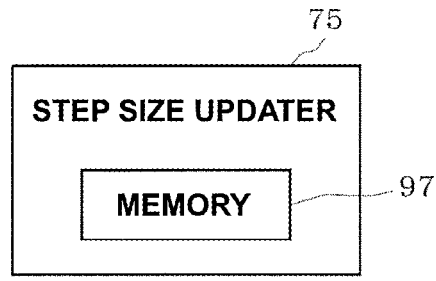
FIG. 6 is a block diagram showing the configuration of a step size updater shown in FIG. 3.

A value of the step size μ may be obtained by measurement in advance, at which an optimal error rate characteristic can be obtained for at least one of the polarization state fluctuation amount Δθ and the SOP fluctuation speed ω, and the correspondence relationship may be stored in a memory 97 shown in FIG. 6. This allows the step size updater 75 to immediately select the appropriate step size μ based on the estimation result of the polarization state estimator 74.

In this case, the step sizes μ may be associated with respective predetermined ranges of the polarization state fluctuation amount Δθ and/or the SOP fluctuation speed ω. In other words, the step size μ may be stored with a certain margin in correspondence with the polarization state fluctuation amount Δθ and/or the SOP fluctuation speed ω. This can reduce the memory capacity. Also, when such a margin is provided, the calculation accuracy of the tap coefficients of the second tap coefficient updater 73 or the polarization state fluctuation amount Δθ and the SOP fluctuation speed ω of the polarization state estimator 74 can be absorbed (accepted).

Figure 7:
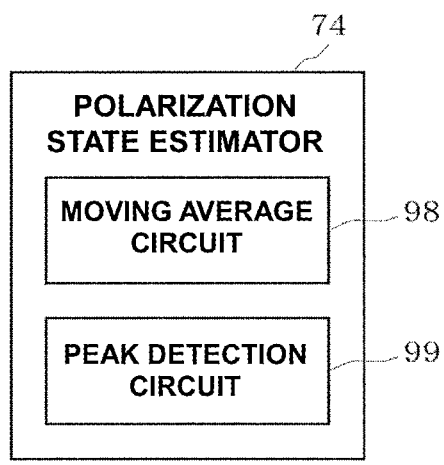
FIG. 7 is a block diagram showing the configuration of the polarization state estimator shown in FIG. 3.

If the SOP fluctuation speed ω output from the polarization state estimator 74 is low (for example, about 0.1 kHz or less), the output of the polarization state estimator 74 fluctuates every time the tap coefficients are updated. For this reason, each of the polarization state fluctuation amount Δθ and the SOP fluctuation speed ω estimated by the polarization state estimator 74 is preferably averaged and supplied to the step size updater 75. At this time, it is more preferable to calculate the moving average (for example, 32 bits) of each of the polarization state fluctuation amount Δθ and the SOP fluctuation speed ω. This can prevent the setting of the step size μ by the step size updater 75 from fluctuating. To do such averaging, a moving average circuit 98 as shown in FIG. 7 is provided in the polarization state estimator 74. The moving average circuit 98 is a circuit that obtains the moving average of the estimated values of the polarization state of the received signal 61, and supplies the obtained average value to the step size updater 75. A circuit having a function similar to that of the moving average circuit 98 may be provided between the polarization state estimator 74 and the step size updater 75.

Concerning the estimation method of the polarization state SOP by the polarization state estimator 74, a method of estimating the SOP fluctuation speed ω from the period T of the polarization state fluctuation amount Δθ has been described above with reference to FIG. 5. When detecting the peak of the polarization state fluctuation amount Δθ, a hysteresis characteristic is preferably imparted. For example, in FIG. 5, if the polarization state fluctuation amount Δθ exceeds a set threshold a designated number of times within a designated period, a peak is detected. If the polarization state fluctuation amount Δθ falls below the set threshold a designated number of times, a peak detection waiting state is set. The set threshold and the designated number of times need not always equal between the peak detection state and the peak detection waiting state, as a matter of course. This can prevent fluctuations both in the estimation result of the SOP fluctuation speed ω and in the setting of the step size μ by the step size updater 75. To perform such peak detection, a peak detection circuit 99 as shown in FIG. 7 is provided in the polarization state estimator 74. The peak detection circuit 99 is a circuit that detects a peak from the estimated polarization state fluctuation amount Δθ using the hysteresis characteristic.

[Operation of Adaptive Equalizer]

Figure 8:
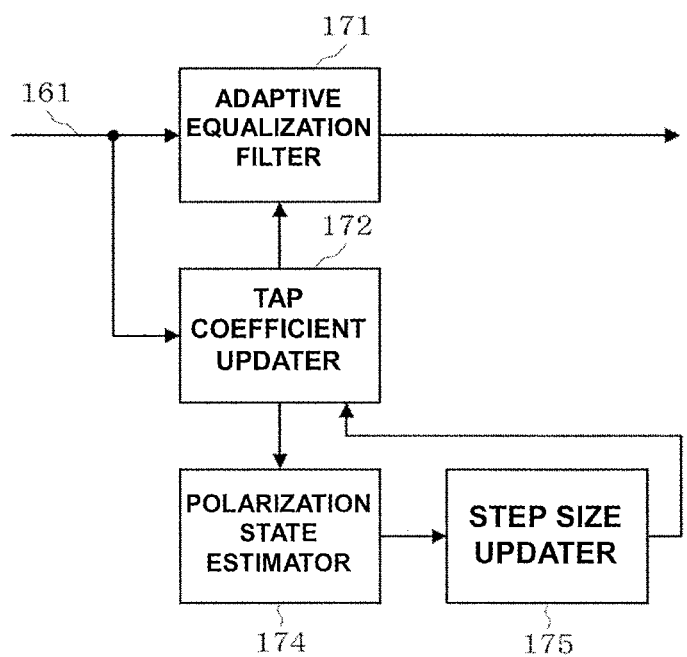
FIG. 8 is a block diagram of a comparative example of the adaptive equalizer.

The operation of the adaptive equalizer 70 according to the embodiment of the present invention will be described next in comparison with a comparative example. In a comparative example of the adaptive equalizer shown in FIG. 8, the digital signal processing unit disclosed in patent literature 1 is rewritten such that it matches the function of the adaptive equalizer 70 according to this embodiment. In the comparative example, tap coefficients to be used in estimation calculation of a polarization state estimator 174 are supplied from a tap coefficient updater 175 whose step size μ is adaptively controlled by a step size updater 172. The rest of the configuration is the same as the configuration of the adaptive equalizer 70.

In the comparative example, the tap coefficients of an adaptive equalization filter 171 are calculated by the tap coefficient updater 172. When the fluctuation of the polarization state of a received signal 161 becomes small, the change of the tap coefficients calculated by the tap coefficient updater 172 becomes small, too. The tap coefficients are supplied to the polarization state estimator 174, and the polarization state is estimated. In this case, since the change of the tap coefficients is small, the polarization state fluctuation amount Δθ or the SOP fluctuation speed ω is estimated as a small value. Since the SOP fluctuation speed ω estimated as a small value is supplied to the step size updater 175, a relatively small step size is calculated and set as the step size μ of the tap coefficient updater 172.

As a result, if it is estimated that the polarization state fluctuation amount Δθ or the SOP fluctuation speed ω of the received signal 161 is small, the relatively small step size μ is set. If the polarization fluctuation is small, high-speed followability is not needed, and therefore, the step size μ may be small.

Next, a case in which the fluctuation of the polarization state of the received signal 161 has then become large will be considered. As described above, once the relatively small step size μ is set in the tap coefficient updater 172, even if the fluctuation of the polarization state becomes large after that, it is impossible to calculate appropriate tap coefficients because the fluctuation of the polarization state cannot be followed because of the small step size μ. Since no appropriate tap coefficients are supplied to the polarization state estimator 174, an appropriate polarization state cannot be estimated, and no appropriate value is set to the step size. As a result, the followability of tap coefficient updating degrades.

In this embodiment, however, the tap coefficients of the adaptive equalization filter 71 are calculated first by the first tap coefficient updater 72. When the fluctuation of the polarization state of the received signal 61 becomes small, the change of the tap coefficients calculated by the first tap coefficient updater 72 becomes small, too. At the same time, the second tap coefficient updater 73 also calculates the tap coefficients. When the fluctuation of the polarization state of the received signal 61 becomes small, the change of the tap coefficients calculated by the second tap coefficient updater 73 becomes small, too.

The tap coefficients calculated by the second tap coefficient updater 73 are supplied to the polarization state estimator 74, and the polarization state is estimated. In this case, since the change of the tap coefficients is small, the polarization state fluctuation amount Δθ or the SOP fluctuation speed ω is estimated as a small value. Since the SOP fluctuation speed ω estimated as a small value is supplied to the step size updater 75, a relatively small step size is calculated and set as the step size μ of the first tap coefficient updater 72.

As a result, if it is estimated that the polarization state fluctuation amount $\Delta\theta$ or the SOP fluctuation speed $\omega$ of the received signal 61 is small, the relatively small step size $\mu$ is set. If the polarization fluctuation is small, high-speed followability is not needed, and therefore, the step size $\mu$ may be small.

Next, a case in which the fluctuation of the polarization state of the received signal 61 has then become large will be considered. In this embodiment, the polarization state is estimated from the tap coefficients calculated by the second tap coefficient updater 73. Since the relatively large fixed step size $\mu_0$ is set to the second tap coefficient updater 73 in advance, the tap coefficients are updated by the relatively large step size $\mu_0$ independently of the magnitude of the fluctuation of the polarization state. Hence, the second tap coefficient updater 73 can obtain the tap coefficients at a high speed. The tap coefficients obtained at a high speed are supplied to the polarization state estimator 74, the polarization state can also be estimated at a high speed, and the step size $\mu$ corresponding to the large fluctuation of the polarization state can be set to the first tap coefficient updater 72. As a result, stable followability of updating of the tap coefficients can be ensured.

Note that since the step size $\mu_0$ is a relatively large fixed value, the calculation accuracy of the tap coefficients is expected to degrade to some extent. However, as described above, since the SOP fluctuation speed $\omega$ associated with each step size has a margin in the memory 97 of the step size updater 75, the degradation of the calculation accuracy of the tap coefficients can be absorbed.

As described above, in this embodiment, the second tap coefficient updater 73 always calculates the tap coefficients using the step size fixed to a relatively large value, and the polarization state estimator 74 estimates the polarization state using the tap coefficients updated by the second tap coefficient updater 73. Hence, even if the polarization state largely varies, it is possible to follow the polarization state at a high speed and use the step size $\mu$ according to the fluctuation amount of the polarization state for calculation in tap coefficient updating. As a result, it is possible to implement stable adaptive equalization following the fluctuation of the polarization state.

Note that the elements 71 to 75 that form the adaptive equalizer 70 shown in FIG. 3 can be discretely formed by hardware. In addition, some or all of the functions of the elements 71 to 75 can also be implemented by operating a computer in accordance with a program.

EXPLANATION OF THE REFERENCE NUMERALS AND SIGNS

10 . . . transmission signal processor, 11a . . . horizontal polarization data, 11b . . . vertical polarization data, 20 . . . optical transmitter, 21 . . . signal light source (signal LD), 22a, 22b . . . 90° combiner, 23 . . . polarization combiner, 30 . . . optical fiber transmission line, 40 . . . optical receiver, 41 . . . polarization separator, 42 . . . local oscillation light source (local oscillation LD), 43a, 43b . . . 90° hybrid circuits, 44 . . . photoelectric converter, 45a . . . X-polarization signal, 45b . . . Y-polarization signal, 50 . . . A/D converter, 60 . . . chromatic dispersion compensator, 61 . . . received signal, 70 . . . adaptive equalizer, 71 . . . adaptive equalization filter, 72 . . . first tap coefficient updater, 73 . . . second tap coefficient updater, 74 . . . polarization state estimator, 75 . . . step size updater, 80 . . . decoder, 91-94 . . . FIR filter, 95, 96 . . . addition circuit, 97 . . . memory, 98 . . . moving average circuit, 99 . . . peak detector

The invention claimed is:

1. An adaptive equalizer comprising:
an adaptive equalization filter configured to adaptively compensate, by updating a tap coefficient, for a waveform distortion caused by a polarization fluctuation of a received signal;
a first tap coefficient updater configured to calculate a tap coefficient according to the polarization fluctuation of the received signal using a variable step size and update the tap coefficient of the adaptive equalization filter with the calculated tap coefficient by itself;
a second tap coefficient updater configured to receive the received signal as an input and calculate a tap coefficient according to the polarization fluctuation of the received signal using a fixed step size by itself without receiving the an output of the adaptive equalization filter;
a polarization state estimator configured to estimate a polarization state of the received signal using the tap coefficient calculated by the second tap coefficient updater; and
a step size updater configured to obtain a step size corresponding to the polarization state estimated by the polarization state estimator and update the variable step size with the obtained step size.

2. The adaptive equalizer according to claim 1, wherein each of the first tap coefficient updater and the second tap coefficient updater calculates the tap coefficient using a sequential updating algorithm for obtaining the tap coefficient by updating the tap coefficient for each step size so as to minimize a comparison error between a transmitted known signal and a true value of the known signal.

3. The adaptive equalizer according to claim 1, wherein the step size updater includes a memory that stores, in advance, step sizes at which optimal error rate characteristics can be obtained for respective predetermined ranges of at least one of a polarization state fluctuation amount and a polarization state fluctuation speed.

4. The adaptive equalizer according to claim 1, wherein the polarization state estimator includes at least one of
a moving average circuit configured to obtain a moving average of an estimated value of the polarization state of the received signal and supply the obtained average value to the step size updater, and
a peak detection circuit configured to detect a peak from the estimated polarization state fluctuation amount using a hysteresis characteristic.

5. An adaptive equalization method comprising:
a step of executing adaptive equalization filtering of adaptively compensating, by updating a tap coefficient, for a waveform distortion caused by a polarization fluctuation of a received signal;
a first tap coefficient updating step of calculating a tap coefficient according to the polarization fluctuation of the received signal using a variable step size and updating the tap coefficient of the adaptive equalization filtering with the calculated tap coefficient by itself;
a second tap coefficient updating step of receiving the received signal as an input and calculating a tap coefficient according to the polarization fluctuation of the received signal using a fixed step size by itself without receiving the an output of the adaptive equalization filtering;
a polarization state estimation step of estimating a polarization state of the received signal using the tap coefficient calculated in the second tap coefficient updating step; and a step size updating step of obtaining the step size corresponding to the polarization state estimated in the polarization state estimation step and updating the variable step size with the obtained step size.

6. The adaptive equalization method according to claim 5, wherein each of the first tap coefficient updating step and the second tap coefficient updating step includes a step of calculating the tap coefficient using a sequential updating algorithm for obtaining the tap coefficient by updating the tap coefficient for each step size so as to minimize a comparison error between a transmitted known signal and a true value of the known signal.

7. The adaptive equalization method according to claim 5, wherein the step size updating step includes a step of selecting the step size using a memory that stores, in advance, step sizes at which optimal error rate characteristics can be obtained for respective predetermined ranges of at least one of a polarization state fluctuation amount and a polarization state fluctuation speed.

8. The adaptive equalization method according to claim 5, wherein the polarization state estimation step includes at least one of a step of obtaining a moving average of an estimated value of the polarization state of the received signal and supplying the obtained average value to the step size updating step, and a step of detecting a peak from the estimated polarization state fluctuation amount using a hysteresis characteristic.

9. An optical communication system comprising:

a chromatic dispersion compensator configured to compensate for a distortion caused by chromatic dispersion of a received signal;

an adaptive equalizer, according to claim 1, configured to compensate for a polarization fluctuation of an output signal of the chromatic dispersion compensator; and a decoder configured to decode an output signal of the adaptive equalizer.

10. The optical communication system according to claim 9, further comprising an optical receiver configured to receive an optical signal and convert the received optical signal into the received signal.

\* \* \* \* \*